Patented Apr. 7, 1936

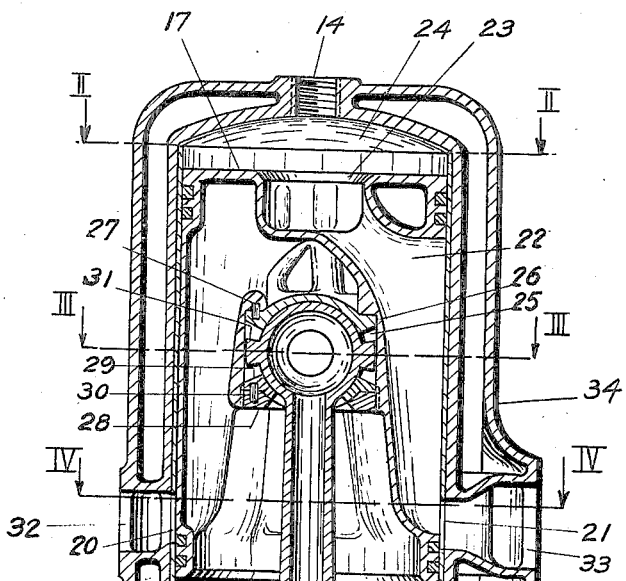
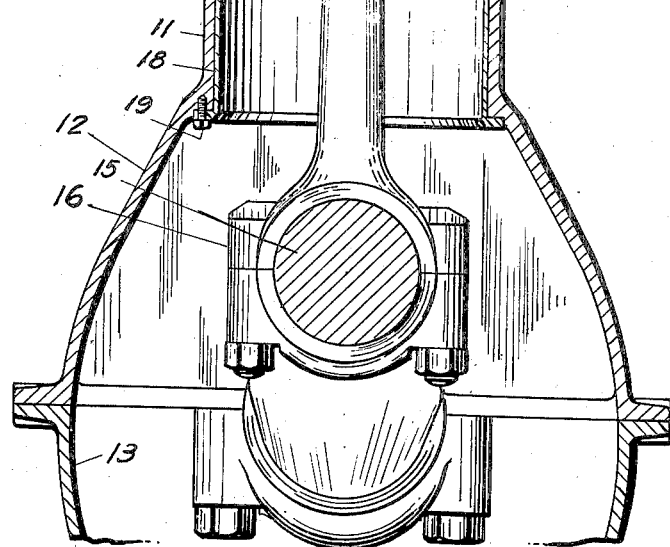
Fig. I

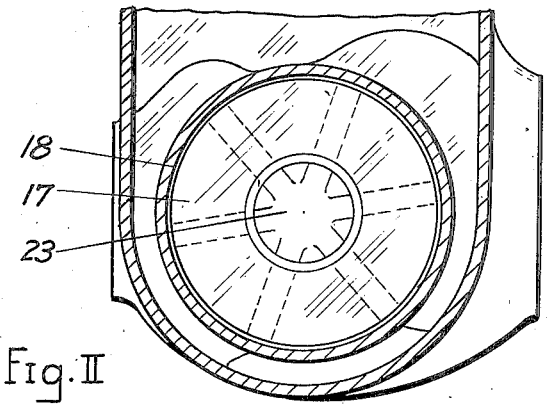
Fig. II
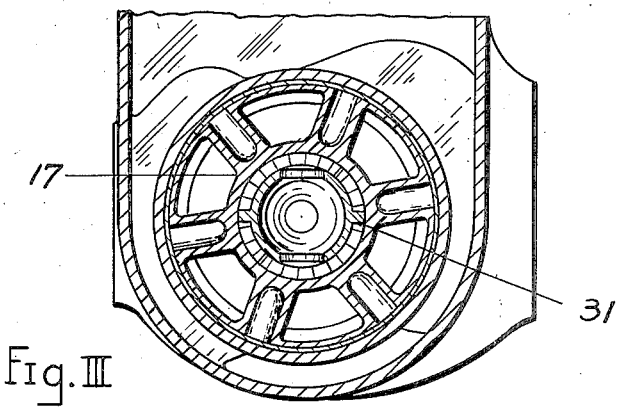
Fig. III
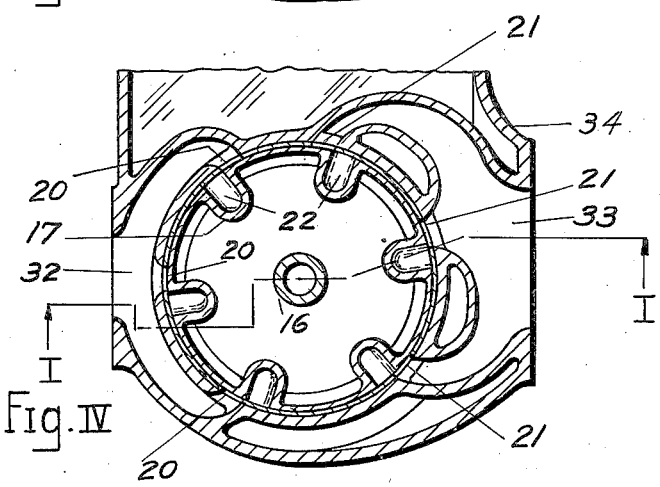
Fig. IV

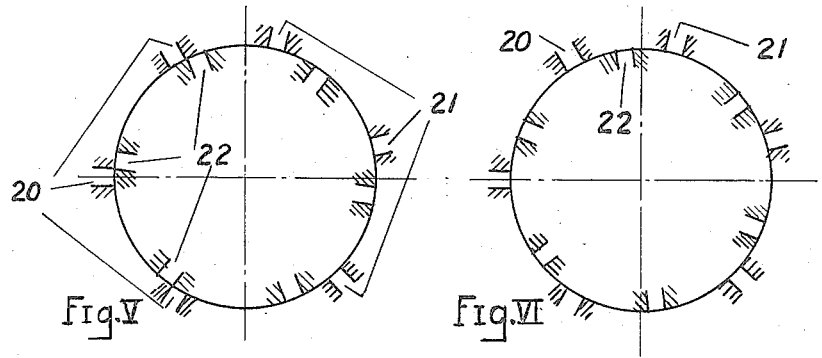
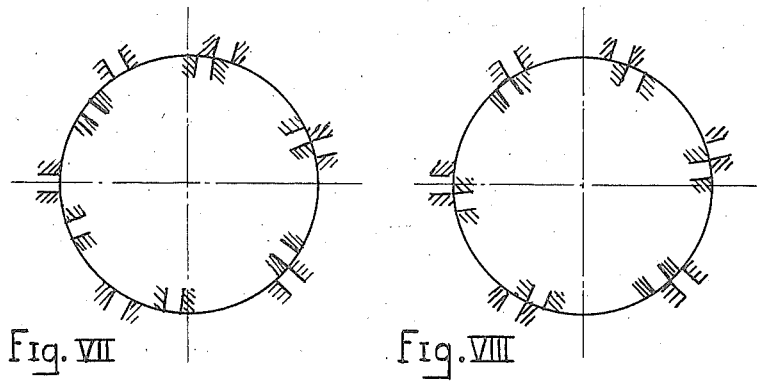
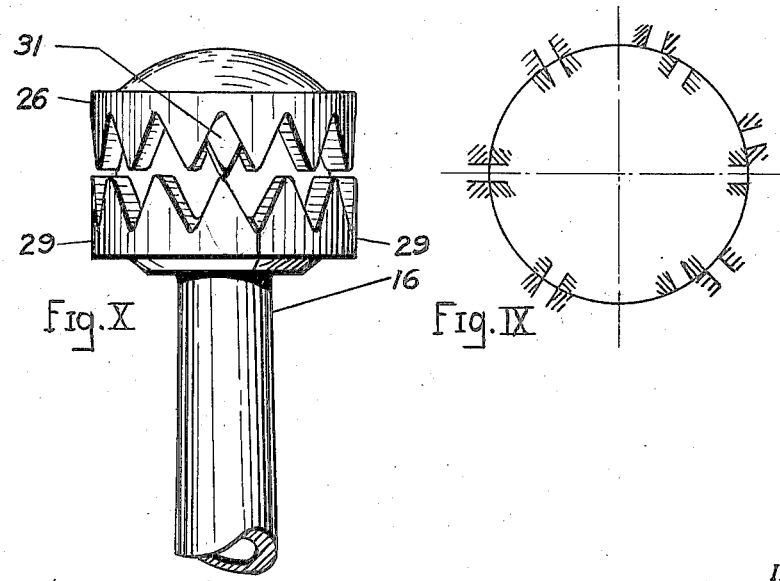

2,036,724

UNITED STATES PATENT OFFICE 2,036,724

RECIPROCATING MECHANISM FOR ENGINES AND SIMILAR UNITS

Adam G. Roth, Detroit, Mich.

Application March 14, 1932, Serial No. 598,691

15 Claims. (Cl. 123—45)

My invention relates to reciprocating mechanisms for use in internal combustion and steam engines, compressors, pumps and similar units of which a preferable embodiment is disclosed for an internal combustion engine and has for one of its objects, the reduction of the number of reciprocating and rotating parts as commonly used in such units.

A further object of the invention is to provide an engine or similar unit of a type, which due to the elimination of the camshaft or sleeve drive shaft, shall be free from vibrations due to rotation of said shafts and those members connected to same in a manner, to produce a reciprocating motion for opening and closing ports or valve passages.

Another object of the invention is to eliminate all noises inherent in the present type or poppet valve actuating mechanisms.

Another object of the invention is to provide an internal combustion engine or similar unit which will be free from noises due to gear or chain drives for valve actuating shafts.

Another object of the invention is to provide an internal combustion engine or similar unit with essential walls and parts so disposed as to give an even and symmetrical arrangement of weight about the vertical center line of the crankshaft with a resulting simplification of cylinder and crankcase.

Another object of the invention is to utilize the reciprocating mechanism of an internal combustion engine or similar unit and the angular motion of the connecting rod to obtain valving results superior to those of poppet valve or sleeve valve operating mechanisms, gaining thereby the advantage of a substantial reduction of the number of rotating and reciprocating parts.

Another object of the invention is to reduce the weight per brake horse power due to introduction of a simplified mechanism for controlling the opening and closing of the passages to and from the combustion chamber in conjunction with the reciprocating piston.

Another object of the invention is to reduce the friction losses in internal combustion engines or similar units by combining the function of a valve mechanism with a reciprocating piston whose travel in the cylinder bore is radial as well as axial to the fixed cylinder.

Another object of the invention is to provide an internal combustion engine or similar unit with a two directionally moving piston, sliding in a cylinder liner whose function is besides providing for the use of wear resisting material for same, for convenient machining of the multiple ports and also for the convenient change of engine timing, by assembling the liner in a manner to advance or retard the opening of the ports in relation to the passages in rotating pistons.

To these and other ends, the invention embodies the novel features of construction and combination of parts indicated on appended drawings and described, and is intended to cover any modifications thereof as may come within the scope of the appended claims.

An example of the invention will now be described with reference to the accompanying drawings in which Figure I is a sectional elevation of an engine embodying the invention, the section being taken on line I—I of Figure IV.

Figure II is a sectional plan taken on line II—II of Figure I.

Figure III is a sectional plan taken on line III—III of Fig. I.

Figure IV is a sectional plan taken on line IV—IV of Figure I.

Figures V to IX inclusively, are diagrammatic plan views, illustrating the position of the port controlling piston during the four periods of the cycle of a four cycle engine. Figure V being an illustration of the ports within the piston in the position, they assume at or about the end of the suction stroke. Figure VI indicates the position of the ports within the piston at or about the end of the compression stroke. Figure VII indicates the position of the ports within the piston at or about the end of the expansion stroke. Figure VIII indicates the position of the ports of the piston at or about the end of the exhaust stroke. Figure IX indicates the position of the ports of the piston at or about to assume, at one third of the suction stroke. Figure X is a side view of the piston rotating mechanism, showing the relation of parts, and position of driving lugs at extreme end of connecting rod throw, whereby opposite lug or lugs are contacting in the same manner as the one shown with part 26, except that the former is in contact with part 29.

Referring to the drawings, in Figure I, 11 represents a cylinder having an enlarged bottom portion 12 forming the upper half of the crankcase and a detachable pan 13 forming the lower half of the crankcase and an integral top portion containing part of the combustion space and tapped hole 14 therein for mounting the spark plug or an injection device therein. The upper portion of the cylinder as well as the combustion chamber 24 and the central intake port 32 and exhaust port 33 are surrounded by a cooling jacket 34 for the dissipation of excess heat due to combustion within the cylinder. The crankshaft 15 is located within the crankcase and is provided with a plurality of connecting rods 16 having pistons 17 mounted thereon which slide within liners 18 interposed between piston and cylinder and held in place with screws 19.

The port openings 20 and 21 machined into the wall of the liners are smaller than the mating ports 32 and 33 cast into the cylinder walls thereby overcoming foundry variations which are difficult to control and a source of considerable expense. If too rigid specifications are to be met and in the case of a multiplicity of small ports where a shifting of cores would mean either machining of ports from within the cylinder bore or scraping of the whole block as a misalignment of ports causes a variation in timing and thereby a difference of power output among the different cylinders. The introduction of a liner having easily and accurately machined ports with the added advantage of using a wear resisting material for this liner alone and a cheaper material for the cylinder will be readily apparent.

The piston 17 is provided with a plurality of ports 22 having separate or a central outlet 23 as shown in Figures I and II for the purpose of communication of the combustion space 24 with intake manifold (not shown), or exhaust manifold (not shown), during the intake or exhaust period.

For the purpose of mounting the piston 17 to the connecting rod 16 and also for housing the piston rotating mechanism, a cylindrical recess 25 is machined into the piston having a spherical upper bearing 26 located therein and kept from turning by a pin 27 and at its lower end a threaded portion to receive nut 28 which later retains the lower bearing halves 29 which also are locked to nut with a pin 30, the whole of which provides an integral unit with the piston which is to rotate around the spherical upper connecting rod end and whose rotation is controlled by a plurality of driving lugs 31 (two shown) and the angular motion of the said lugs and the connecting rod as can be seen in Figs. I and III.

The relation of the driving lugs 31 to the serrations cut into the fixed bearing halves 26 and 29 is shown in side view of connecting rod Fig. X whereby the connecting rod is at or about its extreme right hand throw, viewing engine from the front and it will be seen from Fig. I that as both lugs are integral with the connecting rod, the lug diametrically opposite the one shown in Fig. X, must be in contact with the lower bearing half, thereby providing a most ideal leverage for rotating the piston whose radial movement is, due to the shape of driving lugs and serrations as shown, always under control and the resulting speeds for opening and closing of ports leading through the piston to and from the combustion chamber are unobtainable in poppet or sleeve valve engines whose valve actuating shafts are rotating at half engine speeds and consequently the pumping losses largely due to the slow opening of inlet valves will be greatly reduced in engines incorporating valving features as outlined in my invention wherein full port openings are obtained at or about one-third of the suction stroke. The number of ports 22 in piston as shown in Figures II to IX inclusively is depended on the cycle of the engine in which they are employed and on practical considerations as piston weight, opening areas required and time available for opening and closing, but their spacing must be uniform around the piston while the spacing of ports 20 and 21 depends on the direction of rotation of the piston which is considered to be clockwise in drawings shown and for a four cycle engine and the width of the ports 22, 20, and 21 is dependent on the speed ratio between crankshaft rotation and piston rotation and the port opening angle usually expressed in terms of crankshaft degrees.

Referring to the diagrams Figures V to IX inclusively, illustrating the movement of the port controlling piston, let it be supposed that the engine is rotating clockwise viewed from the front and that the piston is rotating clockwise viewed from the top and that the ratio of engine speed to piston speed is one to six whereby the spacing between the ports on the piston circumference becomes one-sixth of the total circumference and each one of the six spaces is again subdivided into four equal parts, assuming that the engine is a four cycle engine and that each one of the four spaces represents the distance the piston has to travel during each stroke and as for the purpose of this description it will be sufficiently accurate to say that the width of each of the ports is one-forty-eighth of the piston circumference although in practice this width of ports for the same piston to crank-ratio will be much greater as is indicated in Figures II, III, and IV because the port opening may extend over 260 crankshaft degrees in the case of high speed engines instead of 180 crankshaft degrees as has been assumed in the diagrams.

Figure V indicates intake ports 20 just about closed with crank in lower dead center and at beginning of compression stroke.

Figure VI indicates relation of ports at end of compression stroke whereby the distance traveled by piston during the later stroke is given as the overlap between ports 20 and passages 22. It will also be seen in Figure VI that passage 22, having served as intake passage during intake stroke is half-way between exhaust port 21 and intake port 20 and will after completion of expansion stroke serve as exhaust passage during the same cycle just as the passage diagonally opposite from the one described has served as exhaust passage during previous cycle and will serve as intake passage during the following cycle.

Figure VII indicates relation of ports at end of expansion stroke with crank at bottom dead center just at beginning of exhaust stroke whereby it will be seen that three passages in piston are about to uncover exhaust ports.

Figure VIII indicates relation of ports at end of exhaust stroke with crank in top dead center and it will be seen that exhaust ports are just about closed and intake ports just being uncovered for following intake stroke. Figure IX indicates relation of passages to ports on or about one-third suction stroke whereby intake ports are completely uncovered for the communication of intake manifold with combustion space and exhaust ports closed so that due to the vacuum existing in the cylinder during the suction stroke no air or spent gases can enter the cylinder through the exhaust ports.

It will be readily seen from aforesaid diagrams that the number of passages in piston and the number of ports at one time or another in communication with the combustion space is by no means limited to the numbers shown and it will be understood that in the case of a central or siamized intake port serving two or more cylinders, the port location will change to accommodate economical distribution of combustible gases and the number and location of exhaust ports will depend on the suitable arrangement of the exhaust collector pipes which may be cast integral with cylinder block and a single end outlet be used for a plurality of cylinders or separate outlets be cast in cylinder for collecting spent gases outside the cylinder block as is indicated in Figures I and IV.

The integral portion of the cylinder may in special cases where a ready inspection as well as for purposes of cleaning or the use of a material other than used for the cylinder is required, be made a separate part bolted to the top of the cylinder along conventional lines whereby cored holes in said separate head will allow the cooling medium to flow from cylinder jacket to said separate head and passages within piston shall be spaced in top portion separately to facilitate scavenging in two cycle engines or for purposes of creating turbulence within the charge in two or four cycle engines.

It will be readily apparent that the invention described and shown on drawings appended, is susceptible of modifications and arrangements to suit a great variety of conditions and it shall be understood that the description used is merely intended to define the operation of the engine and it is my intention to include any and all modifications which come within the scope of the invention as defined within the appended claims.

Having described the invention, what I desire to secure by letters patent, is:

1. In a reciprocating mechanism for an internal combustion engine, the combination of a fixed cylinder, a crankshaft, a connecting rod, an apertured piston mounted rotable relative to said connecting rod and lugs projecting from said connecting rod end into circularly arranged serrations, the later of which are fixed in the piston in a manner to permit continuous contact between lugs and serrations during the oscillation of the connecting rod causing piston to rotate in one direction within its bore in cylinder over exhaust and intake ports for such part of piston circumference as is required to effectively overlap exhaust ports during down stroke with intake ports open for admission of fluids through passages in piston to combustion chamber, to overlap intake and exhaust ports in cylinder during the following upstroke or compression stroke, to move passages in piston in proximity of exhaust port openings during down or expansion stroke, and to open exhaust passages at commencement of up or exhaust stroke for expulsion of burnt gases.

2. In a reciprocating mechanism for an internal combustion engine, the combination of a cylinder having fixed intake and exhaust ports therethrough, a water jacket surrounding said cylinder and ports, a crankshaft suitably mounted, a connecting rod attached to said crankshaft and provided with a spherical end and having driving lugs, an apertured working piston rotatably mounted relative to said spherical connecting rod end for the purpose of controlling fluid ingress to and egress from said cylinder, said working piston being provided with circularly arranged serrations, said working piston being adapted to reciprocate with said connecting rod and thereby establishing gliding contact between the driving lugs of the spherical rod end and said circularly arranged serrations of said working piston to cause the piston to rotate and a lapping of intake and exhaust ports by piston walls during the major part of expansion stroke, and the opening of exhaust ports during the later part of said stroke, causing opening of intake ports at or about the lower dead center and closing of exhaust and intake ports during first part of second stroke and lapping of said ports during later part of said second stroke with subsequent firing of charge with said working piston at or about the top dead center.

3. In a valveless engine, the combination of a fixed cylinder, having fixed intake and exhaust ports therethrough and a piston reciprocating within said cylinder, attached to a connecting rod having a spherical end portion, lugs projecting from said spherical end portion into circularly arranged serrations disposed within piston and around spherical end portion of connecting rod to cause piston to rotate during angular displacement of said connecting rod.

4. In a reciprocating mechanism, the combination of a fixed cylinder provided with intake and exhaust ports, a crankshaft suitably mounted, a connecting rod operatively connected with said crankshaft and provided with a spherical end having a pair of driving lugs, and a piston provided with passages connecting with the intake and exhaust ports of said fixed cylinder, said piston being reciprocatingly mounted in said fixed cylinder and provided with a pair of hemispherical companion seats engaging the spherical end of said connecting rod to permit said connecting rod together with its driving lugs to pivotally move relative to said piston, said hemispherical companion seats being further provided with toothed surfaces arranged in horizontal planes above and below the center of said spherical end of said connecting rod for engaging the driving lugs of said connecting rod to rotate said piston.

5. In a reciprocating mechanism, the combination of a piston slidably mounted and provided with passages extending therethrough, said piston being provided with an axial bore, a pair of hemi-spherical seats suitably mounted in the axial bore of said piston and each provided with serrations circularly arranged at their edges in said axial bore, and means for actuating said piston, said means comprising a member having a spherical portion mounted in said pair of hemispherical seats to permit said member to pivotally move relative to said piston, said member being provided with a pair of lugs extending between and adapted to engage the serrations of said pair of spherical seats to rotate said piston.

6. In a reciprocating mechanism for an engine or similar unit, the combination of a cylinder, a piston slidably mounted in said cylinder and provided with an axial bore together with passages providing ingress and egress relative to said cylinder, a pair of seat members suitably mounted in the axial bore of said piston and each provided with a hemi-spherical surface together with inwardly facing serrations arranged around their edges and radially around said axial bore, means for securing said pair of seat members from turning in the bore of said piston, and a connecting rod provided with a spherical end having a pair of lugs extending therefrom, the spherical end of said connecting rod engaging the hemi-spherical surface of each of said seat members, the lugs extending from said spherical end being adapted to engage said serrations of said seat members to rotate said piston.

7. In a reciprocating mechanism for an engine or similar units, the combination of a cylinder provided with a bore having ports therein, a piston slidably mounted in said cylinder and provided with passages connecting with the ports of the bore of said cylinder, said piston being provided with a pair of hemi-spherical companion seats together with a pair of oppositely disposed irregular surfaces extending adjacent said hemispherical companion seats, and a connecting rod suitably mounted and having an end pivotally mounted in the hemi-spherical companion seats of said piston, said connecting rod being further provided with a driving lug extending between and adapted to alternately engage said pair of oppositely disposed irregular surfaces to rotate said piston when said connecting rod is pivotally moved.

8. In a reciprocating mechanism for an engine or similar unit, the combination of a cylinder provided with ports, a piston slidably mounted in said cylinder and provided with a central outlet at its inner end together with a plurality of passages connecting said central outlet with the ports of said cylinder, said piston being provided with a supporting boss portion connecting with the inner walls of said plurality of passages, hemi-spherical seat members suitably mounted in said supporting boss portion of said piston and provided with irregular surfaces adjacent the hemi-spherical seats thereof, and a connecting rod suitably mounted to actuate said piston in its sliding movement, said piston having an end suitably retained in said hemi-spherical seat members to permit pivotal movement relative to said piston, said connecting rod being further provided with means for engaging the irregular surfaces of said hemi-spherical seat members to rotate said piston when said connecting rod is pivotally moved relative to said piston.

9. In a reciprocating mechanism for an engine, the combination of a fixed cylinder having fixed intake and exhaust ports therein together with a combustion space, a piston mounted in said fixed cylinder and provided with passages connecting said combustion space with said ports of said fixed cylinder, said piston being provided with companion toothed surfaces on its interior, and means for rotating said piston to control ingress to and egress through said passages to and from said combustion space of said fixed cylinder, said means including a sole connecting rod driven by the engine and having lugs engaging said toothed surfaces of said piston.

10. In a reciprocating mechanism for an internal combustion engine, the combination of a fixed cylinder having intake and exhaust ports therethrough together with a combustion space in the upper portion, a crankshaft suitably mounted, means for firing a charge in said combustion space, a connecting rod operatively connected with and reciprocated by said crankshaft, said connecting rod being provided with a spherical end having driving lugs, and an apertured piston rotatably mounted to control fluid ingress to and egress from said combustion space, said apertured piston being provided with circularly arranged serrations engaged by the driving lugs of said connecting rod to provide rotation of said piston during its reciprocating movements through utilization of the pendulum like movement of said connecting rod about its spherical end, said rotation of said apertured piston occurring in a predetermined direction and at a rate to accomplish an overlapping of the intake and exhaust ports of said fixed cylinder by the walls of said apertured piston during the first portion of the expansion stroke and to open said exhaust ports of said fixed cylinder during the later portion of the expansion stroke of said apertured piston, the rotation of said apertured piston further accomplishing the opening of the intake ports of said fixed cylinder on or about the lower dead center and overlapping of the intake and exhaust ports of said fixed cylinder during the first portion of the instroke of said apertured piston, the later portion of said instroke of said apertured piston being utilized for compression of the fuel charge and supsequent firing with said apertured piston on or about the top dead center.

11. In a reciprocating mechanism for a valveless engine having a crankshaft, the combination of a cylinder provided with a bore and with exhaust and intake ports connecting with said bore, a cylinder head located at one end of said bore and providing a combustion space, a connecting rod connected with said crankshaft and provided with a spherical end having projecting lugs, and a piston provided with through passages and pivotally connected with said connecting rod by means of hemi-spherical companion surface seats for said spherical end and provided with circularly arranged serrations surrounding said hemi-spherical companion seats, said projecting lugs of said connecting rod engaging said circularly arranged serrations of said piston to cause rotation of said piston around its axis, when said connecting rod is angularly displaced in timed relation to said crankshaft, to cause said passages to connect with said exhaust and intake ports to control ingress to and egress from the combustion space of said cylinder head.

12. In a valveless engine, the combination of a fixed cylinder having fixed intake and exhaust ports therethrough, a connecting rod adapted to reciprocate and provided with a spherical end, said connecting rod being further provided with a pair of projections oppositely disposed about its axis, each of said projections being provided with oppositely disposed tapered surfaces, and a piston having passages for registration with said intake and exhaust ports of the cylinder and pivotally mounted on the spherical end of said connecting rod, said piston being provided with two rows of teeth oppositely disposed and arranged in planes extending transversely to the axis of said piston and adapted to be engaged by said projections of said connecting rod, said projections being located between said oppositely disposed rows of teeth of said piston.

13. In a reciprocating mechanism, the combination of a cylinder, means reciprocatingly mounted in said cylinder and provided with two hemi-spherical companion seats having their center located in alignment with the axis of said means, said hemi-spherical companion seats being provided with irregular shaped surfaces oppositely disposed relative to a plane extending at right angles to the axis of said means, said means having passages providing ingress and egress relative to said cylinder, and an actuating member provided with a spherical surface having a bearing in the companion hemi-spherical seats of said means to permit pivotal motion relative to said means, said actuating member being provided with projecting lugs extending between and engaging the irregular shaped surfaces of said hemi-spherical companion seats to cause rotation of said means together with said hemi-spherical companion seats when said actuating member is pivotally moved.

14. In a reciprocating mechanism for an engine or similar unit, the combination of a cylinder provided with ports, a piston movably mounted in said cylinder and provided with a plurality of passages connecting the inner end of said piston with the ports of said cylinder, a connecting rod suitably mounted to move said piston, and means suitably mounted between said plurality of passages of said piston for pivotally supporting one end of said connecting rod relative to said piston, said means comprising also companion toothed surfaces secured to said piston and arranged in horizontal planes around and both above and below the pivoted center of said connecting rod, and operatively engaged by portions of the connecting rod when it is pivotally moved to rotate said piston, the plurality of passages of said piston being thereby moved to register with the ports of said cylinder.

15. In a reciprocating mechanism for an engine or similar unit having intake and exhaust ports, the combination of a reciprocatingly mounted piston member having passages for connecting with the intake and exhaust ports of the engine or similar unit, said reciprocatingly mounted piston member further having hemi-spherical companion seats provided with tooth surfaces arranged substantially in parallel planes extending transversely to its axis, and means for reciprocating said piston member, said means being provided with driving lugs adapted to engage said tooth surfaces of said reciprocatingly mounted piston member to cause rotation thereof, said means being pivotally connected with said reciprocatingly mounted piston member.

ADAM G. ROTH.